United States Patent [19]

Leowald et al.

[11] Patent Number: 5,291,120
[45] Date of Patent: Mar. 1, 1994

[54] METHOD AND APPARATUS FOR SYMMETRICALLY MODULATING A CONTROLLED SERIES COMPENSATION SYSTEM

[75] Inventors: Karl-Friedrich Leowald, Uttenreuth-Weiher; Stephan Weiss, Mergentheim, both of Fed. Rep. of Germany

[73] Assignee: Siemens Aktiengesellschaft, Munich, Fed. Rep. of Germany

[21] Appl. No.: 63,283

[22] Filed: May 18, 1993

[30] Foreign Application Priority Data

May 18, 1992 [EP] European Pat. Off. ........ 92108335.8

[51] Int. Cl.[5] ............................ G05F 1/70; G05F 3/00; G05F 5/00
[52] U.S. Cl. .................................................. 323/209
[58] Field of Search ............... 323/209, 208, 205, 210, 323/211

[56] References Cited

U.S. PATENT DOCUMENTS

| 4,755,738 | 7/1988 | Shimamura et al. | 323/210 |
| 4,771,225 | 9/1988 | Nishikawa | 323/210 |
| 5,099,190 | 3/1992 | Sato | 323/210 |

FOREIGN PATENT DOCUMENTS

| 1241905 | 6/1967 | Fed. Rep. of Germany | 323/209 |
| 3802677 | 8/1989 | France | |
| 3915213 | 11/1990 | France | |
| WO8704538 | 7/1987 | PCT Int'l Appl. | |
| 675416 | 7/1979 | U.S.S.R. | 323/211 |

OTHER PUBLICATIONS

Technischer Verlag Resch, KG, Gräfelfing, Germany, 1967, Dr. Ing. Leonhard Müller: *Reihenkondensatoren in Elektrischen Netzen.*
IEE Meeting, 1991, London, UK, N. Christl et al.: *Power System Studies and Modelling for the Kayenta 230 Kv Substation Advanced Series Compensation*, pp. 33-37.
Cigre Tagung, Summer 1992, N. Christl et al.: *Advanced Series Compensation (ASC) with Thyristor Controlled Impedance*, pp. 1-10.
EPRI Workshop, Nov. 14-16, 1990, Cincinnati, Ohio, Siemens, Munich, Germany: *Advanced Series Compensation with Variable Impedance*, 13 pages.

Primary Examiner—R. Skudy
Assistant Examiner—Ed To
Attorney, Agent, or Firm—Kenyon & Kenyon

[57] ABSTRACT

A method and an apparatus for symmetrically modulating a controlled series compensation system (2) in electrical networks (6). Impedance manipulated variables determined from a current control for the series compensators (14) of the system (2) are limited by determining an upper or lower limiting value ($Z_{OO}, Z_{OU}$). The upper and lower limiting values are respectively determined by adding a positive or negative deviation ($\Delta Z_+, \Delta Z_-$) to and subtracting it from a reference manipulated variable ($Z_O$) for impedance. The reference manipulated variable ($Z_O$) for impedance is selected from the impedance manipulated variables ($Z_{y1}, Z_{y2}, Z_{y3}$). Thus, small asymmetries can be corrected and, given network faults of generally only a brief duration, unnecessary control deviations can be avoided.

5 Claims, 2 Drawing Sheets

METHOD AND APPARATUS FOR SYMMETRICALLY MODULATING A CONTROLLED SERIES COMPENSATION SYSTEM

BACKGROUND OF THE INVENTION

The present invention relates to a method and a device for symmetrically modulating a controlled series compensation system in electrical networks, particularly those including power supply systems.

In series compensation systems, capacitors are typically employed in the wiring run to reduce the current-dependent voltage drop across the line and the transmission angle, in steps. These capacitors are capacitor banks, which are switched on and off in series, as a whole or in several capacitor sections or segments. The capacitor is switched on and off by opening or closing a parallel circuit-breaker. In case of a short-circuit in the network, a parallel arrester, a triggerable spark gap, and/or a parallel circuit-breaker guarantee protection for the capacitor.

Furthermore, a series compensation system is known, in which by means of an inductor connected parallel to the capacitor, the total impedance of this series capacitor (similarly to the case of a thyristor controlled reactor or TCR in the static compensator) is steplessly controlled with a current-converter valve to high-voltage potential through appropriate triggering. A series compensation controlled in this manner is known as an ASC (Advanced Series Compensation). A series compensator controlled in this manner allows the dynamic response of the series compensation to be improved, and the total impedance may be controlled automatically within a certain range, whereby the impedance can be changed from capacitive to inductive.

These types of series capacitors are introduced in the essay, *Automatically Controlled Parallel- and Series Compensation* [*Geregelte Parallel- und Reihenkompensation*], published in the German periodical, "Elektrie", Volume 45, March 1991, pp. 88 through 90. In addition, the International Patent WO 87/04538 describes a series capacitor, which is controlled in such a manner and is integrated in a transmission line.

A controlled series compensation system always has a three-phase design in accordance with its application in series-compensated maximum voltage networks. Its principal tasks are: influencing conduction current (manipulating load flow), influencing bus voltage, and damping line circuit oscillations. These tasks can be fulfilled by a same kind of modulation of the three branches of the controlled series compensation system. The firing angles in these three branches are then the same. A loop controller that is common to the branches of the controlled series compensation system requires an actual value, which is determined in accordance with a procedure defined by the control task from three, possibly unequal measured values. This can comprise eliminating or limiting strongly deviating individual measured values, as can occur when asymmetrical network conditions prevail.

If the task also involves equalizing the conduction-current or conduction-voltage amplitudes (fundamental wave), then this can be solved by forming a separate control loop for each branch. However, this could cause the modulation in the branches to vary considerably (for example, in the case of asymmetrical network faults), which would entail the following disadvantages:

A different impedance can be adjusted for each line; consequently the degree of compensation is not the same in all three lines of one network.

The components of the controlled series compensation system, in particular the capacitor bank, are loaded to varying degrees; the most heavily loaded capacitor bank determines when the entire compensation system is blocked for reasons of protection.

SUMMARY OF THE INVENTION

The present invention provides a method and an apparatus which make it possible to avoid the above-mentioned disadvantages.

Because the variance in the impedance of the controlled series compensation system is limited, one can avoid the above-mentioned disadvantages, which can arise when the conduction current of the phases of a network is regulated to a setpoint value for conduction current. The limiting values are set to allow a small asymmetry in the modulation of up to a few percent to still be corrected. To this end, a reference manipulated variable for impedance is defined from the output quantities (i.e., the impedance manipulated variables) of the conduction current control. On of these three impedance manipulated variables is selected as a reference manipulated variable to be greater than or equal to the smallest and, at the same time, also less than or equal to the largest impedance manipulated variable. From this determined reference manipulated variable for impedance, an upper or lower limiting value is established by adding or subtracting a predetermined positive or negative deviation.

Consequently, the impedance manipulated variables, which are made available from a conduction current control and can differ greatly, are restricted to the changing limiting values. As a result, firing-angle signals are fed to the firing-circuit subassemblies, thus producing a symmetrical (or balanced) modulation.

Stronger asymmetries, which can be caused, for example, by a single-pole network fault, are only equalized in accordance with a predetermined asymmetry (positive or negative deviation). This supplemental method and the corresponding additional device make use of the determined limitation to help avoid unnecessary control deviations, given network faults of generally only a brief duration.

This method for symmetrically modulating the controlled series compensation system also protects this system from an inadvertent, improper operation by an operator in manually adjusting the value of the system impedance.

In the case of one advantageous specific embodiment of the device for implementing the method of the present invention for symmetrically modulating a controlled series compensation system in electrical networks, the device for generating firing-angle signals from the conduction currents and for generating a conduction-current setpoint value is a microcomputer. Therefore, the current controllers for this device are designed as sampling controllers for the microcomputer, and a multitude of functional blocks are processed one after another, always in the same sequence, within each sampling period.

Since a digital, microprocessor-supported controller system is preferably provided to fulfill the function of forward controlling elements and of a controlling system for a controlled series compensation system, the device for implementing the method according to the present invention has the task of programming a program for symmetrically modulating the controlled series compensation system.

BRIEF DESCRIPTION OF THE DRAWINGS

To further clarify the method and apparatus according to the present invention for symmetrically modulating a controlled series compensation system, reference is made to the drawing, which schematically illustrates an exemplified embodiment of a device for implementing the method according to the present invention.

Other features and advantages of the present invention will become apparent from the following description taken in conjunction with the attached drawings, wherein.

DETAILED DESCRIPTION

Figure 1:
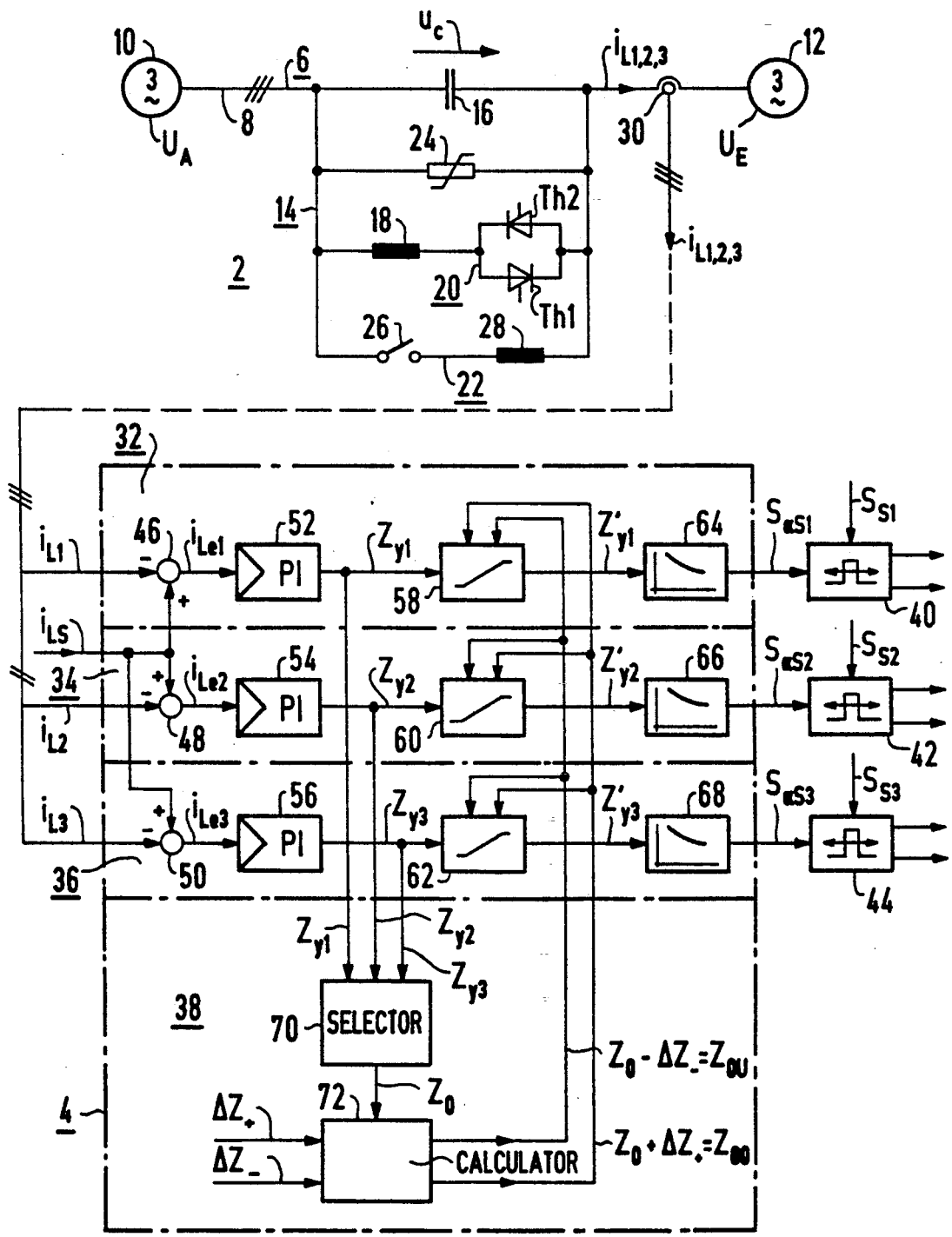
FIG. 1 illustrates a controlled series compensation system having a device for symmetrically modulating this system.

FIG. 1 depicts an equivalent circuit diagram of a controlled series compensation system 2 having a device 4 for symmetrically modulating series compensation system 2. The controlled series compensation system 2 is integrated in a three-phase network 6 consisting of three transmission lines 8, which are each provided at the beginning and end with voltage sources 10 and 12. The respective voltages $U_A$ and $U_E$ of the voltage sources 10 and 12 differ in amplitude by a power voltage drop $\Delta U$ and in a voltage angle of rotation (or phase angle) $\theta$.

The controlled series compensation 2 and network 6 have a three-phase design. That is, the system 2 consists of three controlled series compensators 14, of which only one is depicted in greater detail in FIG. 1 for the sake of clarity. The controlled series compensation is also known as ASC (Advanced Series Compensation). In each case, a controlled series compensator 14 is integrated in a transmission line 8 of the network 6. In most cases, this is done somewhere along line 8, but it can also be integrated at the output or input of switching substations.

The structure of a controlled series compensator 14 can be subdivided into three regions. The core of such a compensator 14 consists of a series capacitor 16, which is integrated serially in the transmission line 8. In this manner, the inductive series impedance of the line 8 which is responsible for the inductive reactive-power component is compensated for. In the case of a controlled series compensator 14, a branch consisting of a coil 18 and of a converter valve 20 is additionally connected in parallel. A parallel connection of two thyristor valves Th1 and Th2, which are arranged antiparallel to one another, is depicted in FIG. 1 as converter valve 20. By means of these two thyristor valves Th1 and Th2, the coil 18 can be brought into the circuit at preset times for the positive and negative half-wave of the capacitor voltage $u_C$. In place of the thyristor valves Th1 and Th2, other semiconductor valves can also be used, such as GTO-thyristors (gate-turn-off thyristors). The structure of a thyristor valve for reactive-current compensation is published in the essay entitled *Power Converters for Static Reactive-Current Compensation* [*Stromrichter fur statische Blindstromkompensation*] in the German periodical "Siemens-Energietechnik", volume 3 (1981), Issue 11 and 12, pp. 353–357.

By means of the branch, it is possible for the effective impedance of the controlled series compensator 14 to be continually changed, capacitively and inductively, through a phase-angle control. In this manner, besides increasing transmission power, a short-circuit current on line 8 may be limited in case of a fault. The advantages enumerated in the textbook, *Series Capacitors in Electric Networks* [*Reihenkondensatoren in elektrischen Netzen*] by Dr.-Eng. Leonhard Müller, 1967, page 4, associated with the application of series capacitors also apply to a controlled series compensator 14.

To protect the series capacitor 16, the coil 18 and the converter valve 20 from overloads caused by high conduction currents $i_L$, a by-pass path 22 and a non-linear resistor 24, also known as an arrester, are installed parallel to series capacitor 16 and the series connection of coil 18 and converter valve 20. A metal-oxide varistor (MOV) is provided, for example, as a non-linear resistor 24. This metal-oxide varistor 24, which is connected electrically parallel to the series capacitor 16, is dimensionally designed to allow non-linear resistor 24 to take over the current conduction very quickly at a predetermined voltage amplitude. Consequently, non-linear resistor 24 protects the series capacitor 16 from longer lasting overload conditions. The energy absorption capacity of a non-linear resistor 24 is naturally limited due to economic considerations. Therefore, a series compensator 14 must also be capable of protecting the series capacitor 16 from overloads with its arrester 24. This task is assumed by the parallel by-pass path 22. This by-pass path 22 consists of a by-pass switch 26 and of a damping circuit 28. The by-pass switch 26 is closed as soon as the loading, i.e., the energy absorption capacity of the arrester 24, is exhausted.

A conduction current $i_{L1}$, $i_{L2}$ or $i_{L3}$ is measured in each case using a device 30 in a transmission line 8 of the network 6. These measured conduction currents $i_{L1}$, $i_{L2}$ or $i_{L3}$ are carried over a fiber-optic system in a manner that is potential-free from the system 2, which is at a high voltage potential, to the device 4 to symmetrically modulate the system 2, which is at earth potential. This potential-free transmission of the conduction currents $i_{L1}$, $i_{L2}$ or $i_{L3}$ is depicted in FIG. 1 by a broken line.

The transmitted conduction current $i_{L1}$, $i_{L2}$ or $i_{L3}$ is carried to a controlling and regulating channel 32, 34 or 36 of the device 4. Moreover, to implement symmetrical modulation, device 4 contains a device 38 for determining an upper limiting value $Z_{00}$ and a lower limiting value $Z_{OU}$. Trigger subassemblies 40, 42, and 44 are connected in an outgoing circuit to each controlling and regulating channel 32, 34 and 36. Firing signals for the converter valve 20 of the series compensators 14 of the system 2 are generated by each trigger subassembly 40, 42 and 44 from a synchronizing signal $S_{S1}$, $S_{S2}$ and $S_{S3}$ and from a firing-angle signal $S_{\alpha S1}$, $S_{\alpha S2}$, and $S_{\alpha S3}$, which are generated from the controlling and regulating channels 32, 34 and 36.

The controlling and regulating channels 32, 34 and 36 respectively consist of a comparator 46, 48 and 50 having a downstream current controller 52, 54 and 56, whose output is linked via a limiter 58, 60 and 62 having a characteristic generator 64, 66 and 68. The line signal $i_{L1}$, $i_{L2}$ or $i_{L3}$ is applied to the negative input of the comparator 46, 48 or 50, and a conduction-current setpoint value $i_{LS}$ is applied in each case to the positive input of the comparator 46, 48 and 50. The current controller 52, 54 or 56, which can be a proportional-plus-integral controller (PI controller), generates an impedance manipulated variable $Z_{y1}$, $Z_{y2}$ or $Z_{y3}$ from the determined conduction-current system deviation $i_{Le1}$, $i_{Le2}$ or $i_{Le3}$ output from comparator 46, 48 or 50, respectively. The impedance manipulated variable $Z'_{y1}$, $Z'_{y2}$ or $Z'_{y3}$ applied to the output of the limiter 58, 60 or 62 is respectively converted by means of the characteristic generator 64, 66 or 68 into a firing-angle signal $S_{\alpha S1}$, $S_{\alpha S2}$, or $S_{\alpha S3}$.

Since the measured conduction currents $i_{L1}$, $i_{L2}$ and $i_{L3}$ can vary in magnitude in dependence upon the phase loading, the generated impedance manipulated variables $Z_{y1}$, $Z_{y2}$ and $Z_{y3}$ also vary. As a result, the series compensators 14 of the system 2 are modulated asymmetrically. This means that the degree of compensation is not the same in all three branches of the controlled series compensation system 2. Moreover, the series capacitors 16 are subjected to variable loads, so that the system 2 is disconnected when a series capacitor 16 is subjected to a particularly strong load.

These disadvantages can be eliminated when the divergence in the generated impedance manipulated variables $Z_{y1}$, $Z_{y2}$, and $Z_{y3}$ is limited. The limiting values $Z_{OO}$ and $Z_{OU}$ should be defined to still allow a modulation characterized by a slight asymmetry of a few percent up to about ten percent. Stronger asymmetries caused by one-sided network faults, for example, will no longer be fully compensated for. This type of limitation will allow unnecessary control deviations to be avoided in the case of the network faults of generally only a brief duration.

To calculate such limiting values $Z_{OO}$ and $Z_{OU}$, a reference manipulated variable $Z_O$ for impedance and a positive or negative deviation $\Delta Z_+$ or $\Delta Z_-$ are used. The positive and negative deviation $\Delta Z_+$ and $\Delta Z_-$ are independent of one another. Their quantity is either fixed or it is varied in dependence upon the operating state of the controlled series compensation system 2 or upon events in the network 6.

The impedance manipulated variable $Z_O$ is formulated with the help of the generated impedance manipulated variables $Z_{y1}$, $Z_{y2}$, and $Z_{y3}$. The impedance manipulated variables $Z_{y1}$, $Z_{y2}$, and $Z_{y3}$ are fed thereby to a selector unit 70, at whose output the impedance manipulated variable $Z_O$ is applied. A device 72 for calculating the upper and lower limiting value $Z_{OO}$ and $Z_{OU}$ is connected to the output of the selector unit 70, whose structure is shown in greater detail in FIG. 2. Calculator 72 is also supplied with a positive and a negative deviation $\Delta Z_+$ and $\Delta Z_-$.

The limiting value $Z_{OO}$ or $Z_{OU}$ is calculated by respectively adding or subtracting the positive or negative deviation $\Delta Z_+$ or $\Delta Z_-$ to or from the reference manipulated variable $Z_O$ for impedance. These limiting values $Z_{OO}$ or $Z_{OU}$ are each fed to limiters 58, 60 and 62. In this manner, at the most, the upper limiting value $Z_{OO}$ can be applied as an impedance manipulated variable $Z'_{y1}$, $Z'_{y2}$ or $Z'_{y3}$, and, at the least, the lower limiting value $Z_{OU}$ can be applied as an impedance manipulated variable $Z'_{y1}$, $Z'_{y2}$ or $Z'_{y3}$ to the outputs of the limiters 58, 60 and 62, independently of the divergence in the impedance manipulated variables $Z_{y1}$, $Z_{y2}$ or $Z_{y3}$. Thus, one achieves a symmetrical modulation of the controlled series compensation system 2, through which the above-mentioned disadvantages can be avoided. Moreover, the degree of compensation is the same in all three branches of the system 2, thus increasing the availability of this system.

Figure 2:
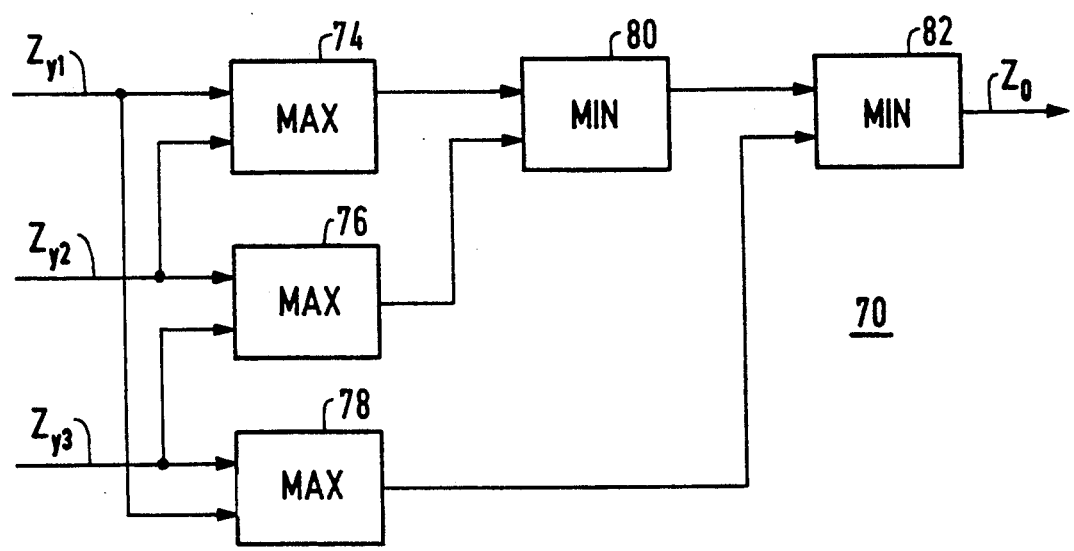
FIG. 2 provides a more detailed illustration of a block diagram of a selector unit for the device according to FIG. 1.

FIG. 2 depicts in greater detail a block diagram of the structure of the selector unit 70 illustrated in FIG. 1. On the input side, selector 70 includes three maximum selector modules 74, 76, and 78. On the output side, selector 70 includes two minimum selector modules 80 and 82. The impedance manipulated variable $Z_{y1}$ is provided to a first input of the first maximum selector module 74 and to a second input of the third maximum selector module 78. The impedance manipulated variable $Z_{y2}$ of the controlling and regulating channel 34 is provided to a first input of the second maximum selector module 76 and to a second input of the first maximum selector module 74. The impedance manipulated variable $Z_{y3}$ is provided to a first input of the third maximum selector module 78 and to a second input of the second maximum selector module 76. The outputs of the first and the second maximum selector module 74 and 76 are connected to the inputs of a first minimum selector module 80, whose output is linked to an input of the downstream minimum selector module 82. The second input of this minimum selector module 82 is linked to the output of the third maximum selector module 78.

Assuming that $Z_{y1} < Z_{y2} < Z_{y3}$, for example, the impedance manipulated variable $Z_{y2}$ is applied to the output of the first maximum selector module 74, the impedance manipulated variable $Z_{y3}$ is applied to the output of the second maximum selector module 76, and the impedance manipulated variable $Z_{y3}$ is applied to the output of the third maximum selector module 78. The impedance manipulated variable $Z_{y2}$ is then applied to the output of the first minimum selector module 80 and the impedance manipulated variable $Z_{y2}$ is then applied to the output of the second minimum selector module 82. This value is then applied at an output of selector 70 as a reference manipulated variable $Z_O$ for impedance to the device 72 for calculating the limiting values $Z_{OO}$ and $Z_{OU}$. Selector unit 70 enables the impedance manipulated variable which is greater than or equal to the smallest and less than or equal to the largest manipulated variable to be selected as a reference manipulated variable $Z_O$ for impedance from the three different impedance manipulated variables $Z_{y1}$, $Z_{y2}$, and $Z_{y3}$. This means that one of the three impedance manipulated variables $Z_{y1}$, $Z_{y2}$, and $Z_{y3}$ is always employed as a reference manipulated variable $Z_O$ to calculate the limiting values $Z_{OO}$ and $Z_{OU}$.

Out of the thus limited impedance manipulated variables for the three series compensators 14 of the controlled series compensation system 2, at least one lies within the range of values between the limiting values $Z_{OO}$ and $Z_{OU}$. Depending on the magnitude of the symmetry to be adjusted, the other impedance manipulated variables also lie within the range of values between the limiting values $Z_{OO}$ and $Z_{OU}$ or they assume the limiting values $Z_{OO}$ and $Z_{OU}$.

One advantageous refinement according to the present invention provides for device 4 to be implemented using a microcomputer, which processes a multitude of functional blocks one after another, always in the same sequence, within each sampling period. The current controllers 52, 54 and 56 are designed thereby as sampling controllers.

What is claimed is:

1. A method for symmetrically modulating a controlled series compensation system in electrical networks, comprising steps of:

generating impedance manipulated variables in response to conduction currents of said controlled series compensation system and in response to a setpoint value for conduction current;

selecting a reference manipulated variable for impedance from said generated impedance manipulated variables, wherein the selected reference manipulated variable for impedance is greater than or equal to a smallest of said impedance manipulated variables and is less than or equal to a largest of said impedance manipulated variables;

determining a minimum limiting value and a maximum limiting value by respectively adding and subtracting a positive and negative deviation from said selected reference manipulated variable for impedance;

limiting each generated impedance manipulated variable to a value in response to said maximum and minimum limiting value; and providing said limited impedance manipulated variables as firing-angle signals to a firing-circuit subassembly.

2. The method according to claim 1, wherein the generating, selecting, determining, limiting and providing steps are performed by a microcomputer.

3. An apparatus for symmetrically modulating a controlled series compensation system in electrical networks, comprising:

a current controller generating impedance manipulated variables in response to conduction currents of said controlled series compensation system and in response to a setpoint value for conduction current;

a selector selecting a reference manipulated variable for impedance from said impedance manipulated variables generated by said current controller, wherein the selected reference manipulated variable for impedance is greater than or equal to a smallest of said impedance manipulated variables and is less than or equal to a largest of said impedance manipulated variables;

a calculator determining a minimum limiting value and a maximum limiting value by respectively adding and subtracting a positive and negative deviation from said reference manipulated variable for impedance selected by said selector;

a limiter limiting each impedance manipulated variable generated by said current controller to a value in response to said maximum and minimum limiting value determined by said calculator; and a characteristic generator providing said limited impedance manipulated variables as firing-angle signals to a firing-circuit subassembly.

4. The apparatus according to claim 3, said selector comprising a first, a second and a third maximum selector module and a first and a second minimum selector module, wherein the first maximum selector module is supplied with a first and a second of said impedance manipulated variables, the second maximum selector module is supplied with the second and a third of said impedance manipulated variables and the third maximum selector module is supplied with the first and the third of said impedance manipulated variables, wherein outputs of said first and second maximum selector modules are connected on an input side to said first minimum selector module, and the output of said first minimum selector module and the output of said third maximum selector module are supplied on an input side to said second minimum selector module.

5. The apparatus according to claim 3, wherein the apparatus for symmetrically modulating a controlled series compensation system comprises a microcomputer.

* * * * *